(12) United States Patent  
Espinosa et al.

(10) Patent No.: US 12,233,719 B2  
(45) Date of Patent: Feb. 25, 2025

(54) VEHICLE CONFIGURED TO ENTER A BATTERY SAVE MODE WHEN IN A KNOWN EXTENDED PARKING LOCATION

(71) Applicant: Ford Global Technologies, LLC, Dearborn, MI (US)

(72) Inventors: Cesar Espinosa, Gustavo A. Madero (MX); Ruben Mendoza, Cuautitlan Izcalli (MX); Martin Lara, Toluca (MX); Luis Osorio, Barrio de Jesús Tlatempa (MX)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 17/750,476

(22) Filed: May 23, 2022

(65) Prior Publication Data

US 2023/0373317 A1     Nov. 23, 2023

(51) Int. Cl.
*B60L 15/20*      (2006.01)

(52) U.S. Cl.
CPC ....... *B60L 15/2045* (2013.01); *B60L 2240/62* (2013.01); *B60L 2240/70* (2013.01); *B60L 2240/80* (2013.01); *B60L 2250/12* (2013.01); *B60L 2260/22* (2013.01); *B60L 2260/54* (2013.01)

(58) Field of Classification Search
CPC ............. B60L 15/2045; B60L 2240/62; B60L 2240/70; B60L 2240/80; B60L 2250/12; B60L 2260/22; B60L 2260/54; B60L 58/14; B60L 2240/622; B60L 50/60; Y02T 10/70; B60R 16/02; B60R 16/033; G07C 5/00
See application file for complete search history.

(56) References Cited

U.S. PATENT DOCUMENTS

| | | | |
|---|---|---|---|
| 6,487,477 B1 | 11/2002 | Woestman et al. | |
| 8,879,451 B2 | 11/2014 | Yi et al. | |
| 8,938,332 B1 | 1/2015 | Zhang et al. | |
| 9,121,356 B2 | 9/2015 | Boesch et al. | |
| 9,419,457 B2 * | 8/2016 | Robinson | H02J 7/00714 |
| 9,462,545 B2 | 10/2016 | Kleve et al. | |
| 10,343,547 B2 | 7/2019 | Hughes et al. | |

(Continued)

FOREIGN PATENT DOCUMENTS

| | | |
|---|---|---|
| JP | 2021005956 A | 1/2021 |
| WO | 2021118675 A1 | 6/2021 |

*Primary Examiner* — Yonel Beaulieu
(74) *Attorney, Agent, or Firm* — David B. Kelley; Carlson, Gaskey & Olds, P.C.

(57) ABSTRACT

The techniques described herein relate to a motor vehicle, including: a battery pack electrically connected to an electric machine and a plurality of electrical loads, wherein the motor vehicle is operable in a full power mode in which power can flow from the battery pack to the electric machine and each of the plurality of electrical loads, and a battery save mode in which a flow of power is prevented between the battery pack and either or both of the electric machine or at least some of the plurality of electrical loads; and a controller configured to command the motor vehicle to operate in the battery save mode if the motor vehicle has been parked in a known extended parking location for a first time period, or if the motor vehicle has been parked in a location other than a known extended parking location for a second time period longer than the first time period.

20 Claims, 2 Drawing Sheets

(56) References Cited

U.S. PATENT DOCUMENTS

| | | |
|---|---|---|
| 10,640,064 B2 | 5/2020 | Lin et al. |
| 10,719,122 B2 | 7/2020 | Marti et al. |
| 11,577,739 B1* | 2/2023 | Walli .................. G07C 5/008 |
| 2009/0088910 A1 | 4/2009 | Yi et al. |
| 2010/0185552 A1 | 7/2010 | DeLuca et al. |
| 2011/0004523 A1 | 1/2011 | Giuli et al. |
| 2011/0106330 A1 | 5/2011 | Lickfelt |
| 2012/0109407 A1 | 5/2012 | Yousefi et al. |
| 2012/0187915 A1 | 7/2012 | Brombach et al. |
| 2012/0188101 A1* | 7/2012 | Ganot .................. G07B 15/02 340/932.2 |
| 2013/0187915 A1 | 7/2013 | Lee et al. |
| 2014/0343831 A1 | 11/2014 | Hosey et al. |
| 2015/0170368 A1 | 1/2015 | Janky et al. |
| 2015/0094937 A1 | 4/2015 | Holub |
| 2015/0197160 A1 | 7/2015 | Buecherl |
| 2015/0341862 A1 | 11/2015 | Lei et al. |
| 2016/0311384 A1 | 10/2016 | Acuna et al. |
| 2016/0311385 A1 | 10/2016 | Wojcik et al. |
| 2017/0174157 A1 | 6/2017 | Deljevic et al. |
| 2019/0147744 A1 | 5/2019 | Grimm et al. |
| 2020/0294401 A1 | 9/2020 | Kerecsen |
| 2021/0094417 A1* | 4/2021 | Cobo .................. B60K 28/04 |
| 2021/0256833 A1 | 8/2021 | Daoura et al. |
| 2023/0326261 A1* | 10/2023 | Walli .................. G07C 5/0841 701/1 |

\* cited by examiner

VEHICLE CONFIGURED TO ENTER A BATTERY SAVE MODE WHEN IN A KNOWN EXTENDED PARKING LOCATION

TECHNICAL FIELD

This disclosure relates to a vehicle configured to enter a battery save mode when the vehicle is in a known extended parking location, and a corresponding method.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle. A high voltage battery pack typically powers the electric machines and other electrical loads of the electrified vehicle.

SUMMARY

In some aspects, the techniques described herein relate to a motor vehicle, including: a battery pack electrically connected to an electric machine and a plurality of electrical loads, wherein the motor vehicle is operable in a full power mode in which power can flow from the battery pack to the electric machine and each of the plurality of electrical loads, and a battery save mode in which a flow of power is prevented between the battery pack and either or both of the electric machine or at least some of the plurality of electrical loads; and a controller configured to command the motor vehicle to operate in the battery save mode if the motor vehicle has been parked in a known extended parking location for a first time period, or if the motor vehicle has been parked in a location other than a known extended parking location for a second time period longer than the first time period.

In some aspects, the techniques described herein relate to a motor vehicle, wherein the first time period is at least five times shorter than the second time period.

In some aspects, the techniques described herein relate to a motor vehicle, wherein the first time period is 5 minutes and the second time period is 30 minutes.

In some aspects, the techniques described herein relate to a motor vehicle, wherein the controller is configured to store or access a list of known extended parking locations.

In some aspects, the techniques described herein relate to a motor vehicle, wherein the list of known extended parking locations includes locations manually entered by a user.

In some aspects, the techniques described herein relate to a motor vehicle, wherein the controller is configured to add a location to the list of known extended parking locations if the motor vehicle is routinely parked in the location for an extended period of time.

In some aspects, the techniques described herein relate to a motor vehicle, wherein the controller is in electronic communication with a server, and the server is configured to identify a potential location for addition to the list of known extended parking locations.

In some aspects, the techniques described herein relate to a motor vehicle, wherein the server is configured to use an algorithm to identify a potential location for addition to the list of known extended parking locations.

In some aspects, the techniques described herein relate to a motor vehicle, wherein the controller is configured to cause a prompt to be issued to a user asking the user to approve the addition of the potential location to the list of known extended parking locations.

In some aspects, the techniques described herein relate to a motor vehicle, wherein the controller is configured to permit a user to manually edit the list of known extended parking locations.

In some aspects, the techniques described herein relate to a motor vehicle, wherein the controller is configured to determine that the motor vehicle has parked when an ignition of the motor vehicle is off.

In some aspects, the techniques described herein relate to a motor vehicle, wherein the controller is in electronic communication with a global positioning system (GPS), and wherein the controller determines whether the motor vehicle is in a known extended parking location based on information from the GPS.

In some aspects, the techniques described herein relate to a motor vehicle, wherein the motor vehicle is an electrified vehicle.

In some aspects, the techniques described herein relate to a method, including: operating a motor vehicle in a battery save mode, in which a flow of power is prevented between a battery pack of an motor vehicle and either or both of an electric machine or one or more electrical loads, if the motor vehicle has been parked in a known extended parking location for a first time period, or if the motor vehicle has been parked in a location other than a known extended parking location for a second time period longer than the first time period.

In some aspects, the techniques described herein relate to a method, further including: identifying a potential known extended parking location when the motor vehicle routinely parks in a location for an extended period of time.

In some aspects, the techniques described herein relate to a method, wherein the extended period of time is at least an hour.

In some aspects, the techniques described herein relate to a method, wherein potential known extended parking locations are identified by a server using an algorithm and are presented to a user for approval.

In some aspects, the techniques described herein relate to a method, wherein the first time period is at least five times shorter than the second time period.

In some aspects, the techniques described herein relate to a method, wherein the first time period is 5 minutes and the second time period is 30 minutes.

In some aspects, the techniques described herein relate to a method, further including determining that the motor vehicle has parked when an ignition of the motor vehicle is off.

DETAILED DESCRIPTION

This disclosure relates to a vehicle configured to enter a battery save mode when the vehicle is in a known extended parking location, and a corresponding method. This disclosure preserves a state of charge of the battery pack of the vehicle by promptly entering a battery save mode when the vehicle is parked in locations where the vehicle is known to be routinely parked for extended periods of time. Example locations are a home of the user, where the user typically parks their car overnight, or a workplace of the user, where the user typically parks their vehicle for hours at a time. In such locations, the vehicle does not wait for a relatively long, default time period to lapse before entering a battery save mode. Rather, the battery save mode can be entered after a shorter time period has lapsed which, again, preserves the state of charge of the battery pack. Additional benefits will be appreciated from a review of the below description.

Figure 1:
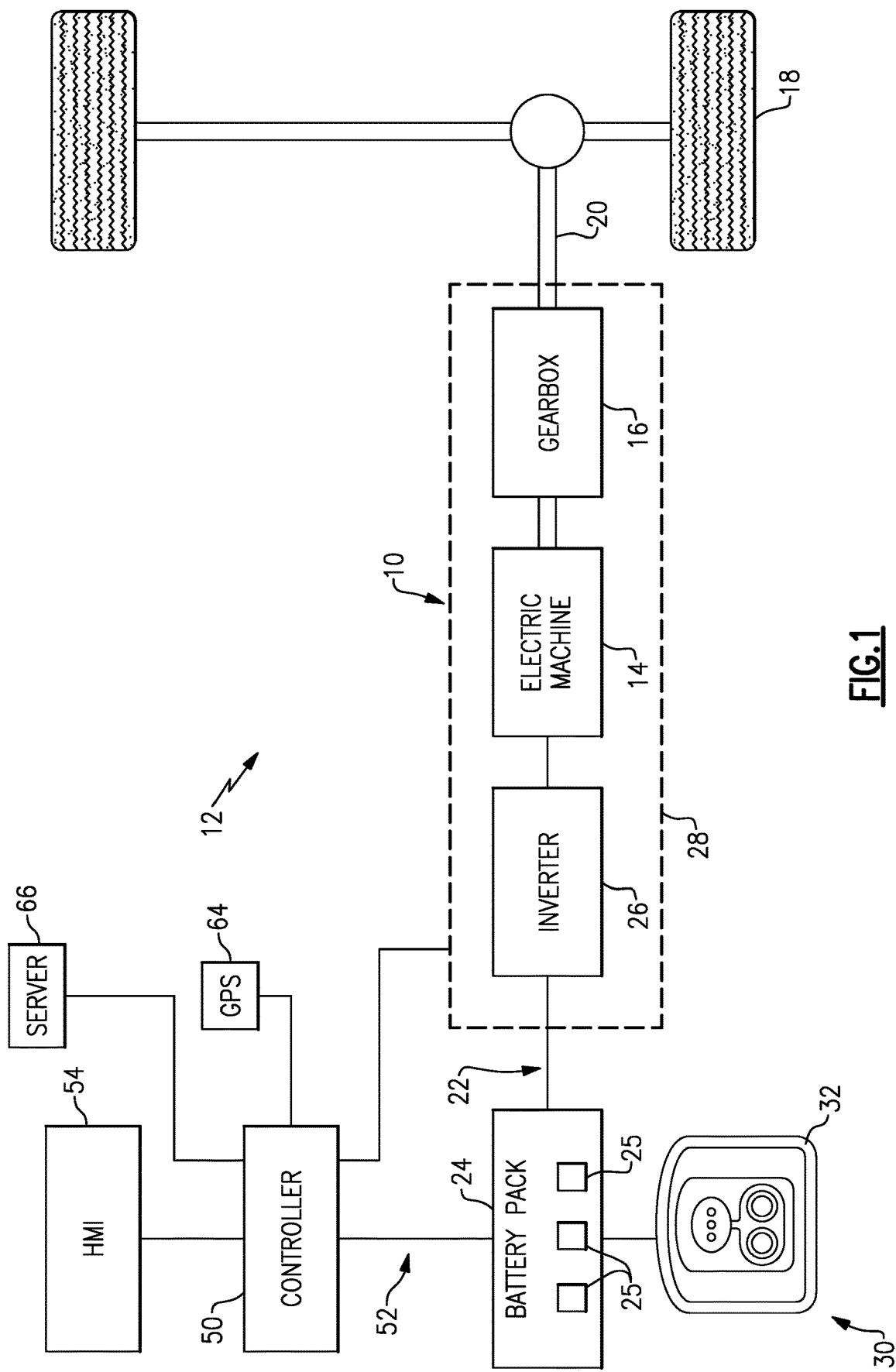
FIG. 1 schematically illustrates a powertrain and other components of an electrified vehicle.

FIG. 1 schematically illustrates a powertrain 10 of an electrified vehicle 12 ("vehicle 12"). Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the vehicle 12 could be equipped with an internal combustion engine that can be employed either alone or in combination with other energy sources to propel the vehicle 12.

In a non-limiting embodiment, the vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the vehicle 12. Other types of energy storage devices and/or output devices can also be used to electrically power the vehicle 12.

The vehicle 12 may also include a charging system 30 for periodically charging the energy storage devices (e.g., battery cells) of the battery pack 24. The charging system 30 may be connected to an external power source, such as a grid power source, for receiving and distributing power to the energy storage devices. For example, in one non-limiting embodiment, the charging system 30 includes a charging port 32 located on-board the vehicle 12. The charging port 32 is adapted to selectively receive power from the external power source, such as from a power cable connected to the external power source, and then distribute the power to the battery pack 24 for charging the energy storage devices.

The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

The vehicle 12 also includes a controller 50 for monitoring and/or controlling various aspects of the powertrain 10 associated with the vehicle 12. The controller 50, for example, may communicate with the battery pack 24, the charging system 30, and the charging port 32. The controller 50 may also communicate with various other vehicle components and monitor various other vehicle conditions. The controller 50 includes electronics, software, or both, to perform the necessary control functions for operating the vehicle 12.

In one non-limiting embodiment, the controller 50 is a combination vehicle system controller and powertrain control module (VSC/PCM). Although it is shown as a single device, the controller 50 may include multiple controllers in the form of multiple hardware devices, or multiple software controllers with one or more hardware devices. A controller area network 52 (CAN) allows the controller 50 to communicate with the various components of the vehicle 12. This disclosure is not limited to CAN protocol and extends to other communication protocols.

The vehicle 12 also includes a human-machine interface 54. In one example, the human-machine interface 54 is provided in a vehicle cabin and is accessible by a user from within the vehicle 12. The human-machine interface 54 is an interactive display, such as a graphical user interface (GUI), in one example. In one particular example, the human-machine interface 54 includes a touchscreen, which is configured to display information to the user and allow the user to provide inputs. The controller 50 is in communication with the human-machine interface 54. The inputs the user provides to the human-machine interface 54 are interpreted by the controller 50, which then executes operations consistent with the inputs. One example human-machine interface 54 is provided, at least in part, by the SYNC® System offered commercially by Ford Motor Company. The human-user interface 54 could alternatively or additionally be provided by a mobile device of a user, and may include a software application running on that mobile device, such as the FordPass® application offered commercially by Ford Motor Company.

The controller 50 can determine the location of the vehicle 12 using a global positioning satellite (GPS) system 64. While a GPS is shown, the vehicle 12 could include additional or alternative location systems. Additionally, the controller 50 can be in electronic communication with at least one server 66 over the Internet, for example. The server 66 could be part of a cloud computing network in communication with the controller 50.

Normally, when the vehicle 12 is parked, the vehicle 12 will remain in a full power mode for a default period of time. A full power mode is defined as a mode in which power is able to flow from the battery pack 24 to the electric machine 14 and any other electrical loads of the vehicle 12. Again, normally, after the default period of time has lapsed, such as 30 minutes, the controller 50 will then issue one or more commands to cause the electrified vehicle to enter a battery save mode. In a battery save mode, which may be referred to as a sleep mode, limited power consumption mode, or a low power mode, the battery pack 24 is disconnected, by opening one or more switches, for example, from the electric machine 14 and/or one or more of the other electrical loads of the vehicle 12. In any case, fewer devices are powered by the battery pack 24 in the battery save mode than in the full power mode. In the battery save mode, one or more electrical loads of the vehicle 12 may be powered, such as electrical loads like transmitters that are used to receive lock, unlock, and/or remote start commands from a keyfob or mobile device, for example. In another example, in the battery save mode, an alarm of the vehicle 12 may remain powered by the battery pack 24.

In this disclosure, the vehicle 12 does not wait for the default time period to lapse when the vehicle 12 is in a known extended parking location. Known extended parking locations are locations in which the vehicle 12 is known to routinely be parked for an extended period, such as 30 minutes or 1 hour. As such, when parked in these locations, this disclosure takes advantage of the high probability that full vehicle power will not be needed soon after parking, and therefore takes steps to preserve the state of charge of the battery pack 24. While the battery pack 24 is mentioned, this disclosure could apply to other vehicle batteries such as 12 Volt batteries, especially when the vehicle includes an internal combustion engine.

Known extended parking locations may be added to a list of such locations, which is accessible by or stored on the controller 50. The list may be stored on the controller 50 and/or on the server 66. Known extended parking locations may be added to the list manually, by allowing a user to input known extended parking locations via the HMI 54, or the controller 50 and/or server 66 may use an algorithm or machine learning to determine additional potential known extended parking locations. When the controller 50 and/or server 66 identifies a potential known extended parking location, the potential known extended parking location may be sent to a user via the HMI 54 for approval before being added to the list. In one example, the controller 50 and/or the server 66 will suggest that a potential known extended parking location be added to the list if the vehicle 12 is parked in the potential known extended parking location for at least an hour, at least once a week, for at least three consecutive weeks. Alternatively, the controller 50 and/or the server 66 will suggest that a potential known extended parking location be added to the list if the vehicle 12 is parked in the potential known extended parking location for at least 30 minutes on at least five separate occasions. While some example factors for evaluating a routinely-visited, extended parking location are defined herein, this disclosure extends to other example factors. Further, the list can be edited manually by the user at any time using the HMI 54.

When the vehicle 12 is parked in a known extended parking location, as indicated by the GPS 64 and one or more factors indicative of the vehicle 12 being parked, the controller 50 will issue one or more commands to enter the battery save mode in a period of time shorter than the default period of time. In an example, the period of time is less than half the default period of time. In a further example, the period of time is at least 5 times shorter than the default period of time. In a particular example, the period of time is 5 minutes while the default period of time is 30 minutes. While particular time periods are mentioned, this disclosure extends to other time periods. In a particular example, the period of time is calibratable.

In an example, the vehicle 12 will be considered within the known extended parking location if the vehicle 12 is within a predetermined distance, such as 100 feet, of the known extended parking location, to account for potential inaccuracies of the GPS 64 and/or situations where a user has to park slightly further from their normal parking location at work or home, as examples. While a specific distance, namely 100 feet, is mentioned, the predetermined distance is calibratable.

Figure 2:
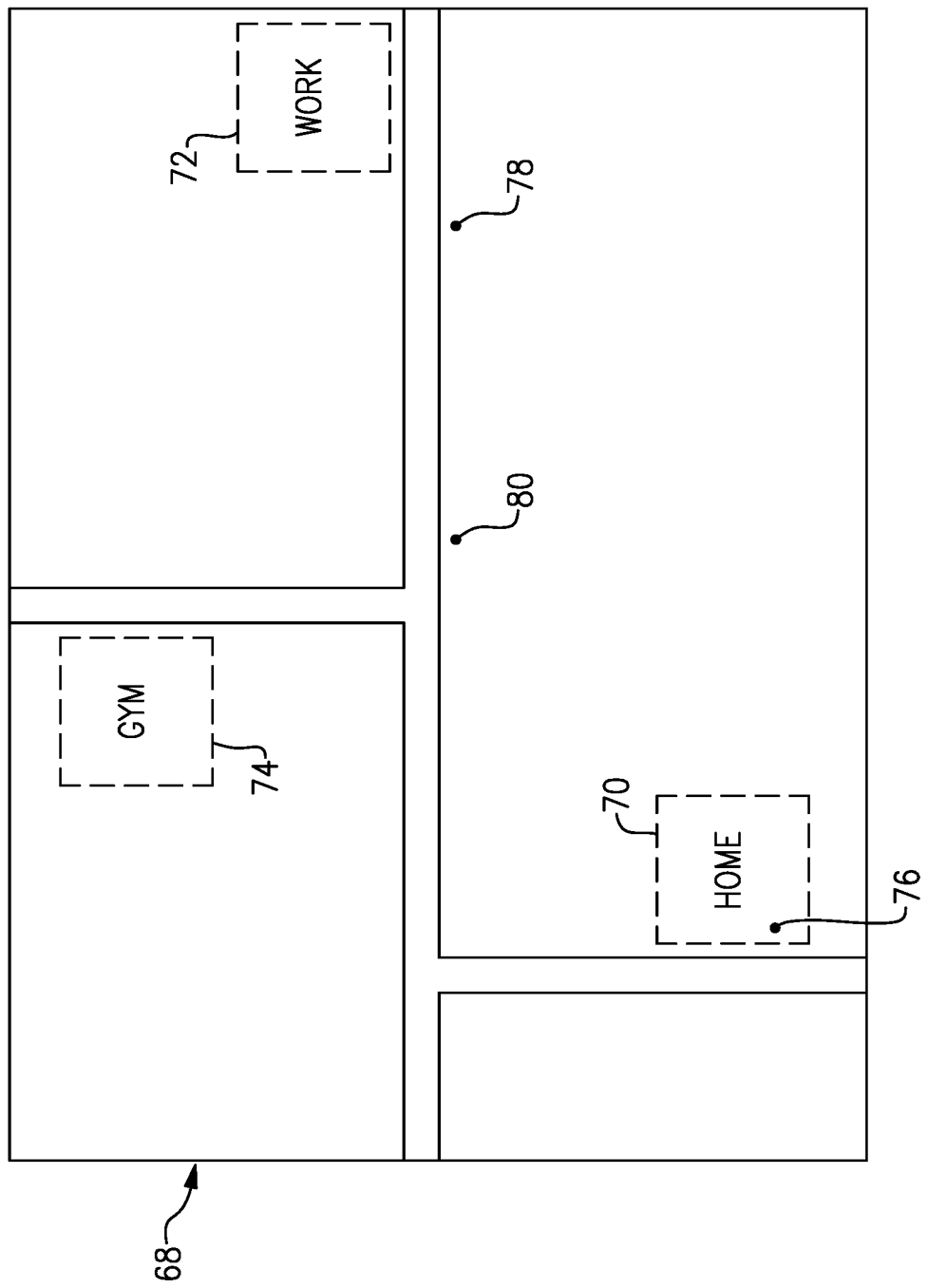
FIG. 2 is representative of a map showing a plurality of known extended parking locations.

FIG. 2 illustrates a map 68. The map 68 may be stored on or accessed by the controller 50. The GPS 64 is configured to determine a location of the vehicle 12 relative to the map 68. The map 68 includes a plurality of roads and other landmarks, for example. The map 68 also includes first, second, and third known extended parking locations 70, 72, 74, corresponding to a home of the user, a workplace of the user, and a gym of the user, respectively. The first, second, and third known extended parking locations 70, 72, 74 may be geofences. In this example, the first and second known extended parking locations 70, 72 were added to the list manually by a user. The third known extended parking location 74 was identified as a potential known extended parking location by the controller 50 and/or server 66 because the user visited the gym at least once a week for at least three consecutive weeks, and parked the vehicle 12 at the gym for at least an hour each visit. The third known extended parking location 74 was presented to the user via the HMI 54 and the user approved the addition to the list.

The dot 76 represents the vehicle 12 being parked within the first known extended parking location 70, which is a home of the user. When the vehicle 12 is parked at dot 76, the controller 50 begins a timer when the vehicle 12 is determined to be in park, such as by monitoring whether the ignition of the vehicle 12 is off and/or whether the vehicle 12 is shifted into park. After determining the vehicle 12 is in park, a timer begins. After a relatively short time period lapses, such as 5 minutes, the controller 50 issues one or more commands to enter a battery save mode.

While the ignition status and gear position are mentioned, the controller 50 may consider other information indicative of the vehicle 12 being parked. For instance, the controller 50 could also monitor whether a driver door has opened and closed. In some instances, the controller 50 will not enter the battery save mode if the four-way lights or other indicator lights of the vehicle 12 are blinking and active. The controller 50 may employ other vehicle occupation and/or classification strategies.

Dot 78 represents the vehicle 12 being parked adjacent a workplace of the user, which is the second known extended parking location 72. At dot 78, the vehicle 12 is not inside the second known extended parking location 72 but is within a predetermined range of a perimeter of the second known extended parking location 72, such as within 100 feet of the perimeter of the second known extended parking location 72. As such, the controller 50 will consider the vehicle 12 to be within the second known extended parking location 72. Therefore, in turn, the controller 50 will command the vehicle 12 to enter the battery save mode after the vehicle 12 has been parked at dot 78 for 5 minutes, in this example.

Dot 80 represents the vehicle 12 being parked in a location that does not correspond to a known extended parking location. The area adjacent dot 80 may be considered as a potential future known extended parking location if the user begins to routinely park in this location for extended periods, but dot 80 has not yet attained this status. Dot 80 may correspond to a location of a convenience store, for example, where the user frequents but not for extended periods, or a hospital, where the user may park for an extended period but does not frequent. When parked at dot 80 for the default time period, however, the controller 50 will still command the vehicle 12 to operate in the battery save mode.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a battery pack electrically connected to an electric machine and a plurality of electrical loads, wherein the motor vehicle is operable in a full power mode in which power can flow from the battery pack to the electric machine and each of the plurality of electrical loads, and a battery save mode in which a flow of power is prevented between the battery pack and either or both of the electric machine or at least some of the plurality of electrical loads; and
   a controller, wherein the controller is configured to command the motor vehicle to operate in the battery save mode if the motor vehicle has been parked in a known extended parking location for a first time period, and wherein the controller is also configured to command the motor vehicle to operate in the battery save mode if the motor vehicle has been parked in a location other than a known extended parking location for a second time period longer than the first time period.

2. The motor vehicle as recited in claim 1, wherein the first time period is at least five times shorter than the second time period.

3. The motor vehicle as recited in claim 2, wherein the first time period is 5 minutes and the second time period is 30 minutes.

4. The motor vehicle as recited in claim 1, wherein the controller is configured to store or access a list of known extended parking locations.

5. The motor vehicle as recited in claim 4, wherein the list of known extended parking locations includes locations manually entered by a user.

6. The motor vehicle as recited in claim 4, wherein the controller is configured to add a location to the list of known extended parking locations if the motor vehicle is routinely parked in the location for an extended period of time.

7. The motor vehicle as recited in claim 6, wherein the controller is in electronic communication with a server, and the server is configured to identify a potential location for addition to the list of known extended parking locations.

8. The motor vehicle as recited in claim 7, wherein the server is configured to use an algorithm to identify a potential location for addition to the list of known extended parking locations.

9. The motor vehicle as recited in claim 8, wherein the controller is configured to cause a prompt to be issued to a user asking the user to approve the addition of the potential location to the list of known extended parking locations.

10. The motor vehicle as recited in claim 4, wherein the controller is configured to permit a user to manually edit the list of known extended parking locations.

11. The motor vehicle as recited in claim 1, wherein the controller is configured to determine that the motor vehicle has parked when an ignition of the motor vehicle is off.

12. The motor vehicle as recited in claim 1, wherein the controller is in electronic communication with a global positioning system (GPS), and wherein the controller determines whether the motor vehicle is in a known extended parking location based on information from the GPS.

13. The motor vehicle as recited in claim 1, wherein the motor vehicle is an electrified vehicle.

14. A method, comprising:
   operating a motor vehicle in a battery save mode, in which a flow of power is prevented between a battery pack of an motor vehicle and either or both of an electric machine or one or more electrical loads, if the motor vehicle has been parked in a known extended parking location for a first time period; and
   operating the motor vehicle in the battery save mode if the motor vehicle has been parked in a location other than a known extended parking location for a second time period longer than the first time period.

15. The method as recited in claim 14, further comprising:
   identifying a potential known extended parking location when the motor vehicle routinely parks in a location for an extended period of time.

16. The method as recited in claim 15, wherein the extended period of time is at least an hour.

17. The method as recited in claim 15, wherein potential known extended parking locations are identified by a server using an algorithm and are presented to a user for approval.

18. The method as recited in claim 14, wherein the first time period is at least five times shorter than the second time period.

19. The method as recited in claim 18, wherein the first time period is 5 minutes and the second time period is 30 minutes.

20. The method as recited in claim 14, further comprising determining that the motor vehicle has parked when an ignition of the motor vehicle is off.

* * * * *